United States Patent
Oyama et al.

(10) Patent No.: US 10,105,846 B2
(45) Date of Patent: Oct. 23, 2018

(54) ROBOT CONTROL SYSTEM HAVING STOP FUNCTION

(71) Applicant: FANUC Corporation, Yamanashi (JP)

(72) Inventors: Takumi Oyama, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 53 days.

(21) Appl. No.: 14/800,804

(22) Filed: Jul. 16, 2015

(65) Prior Publication Data

US 2016/0016313 A1 Jan. 21, 2016

(30) Foreign Application Priority Data

Jul. 17, 2014 (JP) .................................. 2014-147099

(51) Int. Cl.
*B25J 9/16* (2006.01)
*B25J 19/00* (2006.01)
*G05B 19/4063* (2006.01)

(52) U.S. Cl.
CPC ......... *B25J 9/1674* (2013.01); *B25J 19/0004* (2013.01); *G05B 19/4063* (2013.01); *G05B 2219/42309* (2013.01); *G05B 2219/42314* (2013.01); *Y10S 901/09* (2013.01)

(58) Field of Classification Search
CPC .. B25J 9/1674; B25J 19/0004; G05B 19/4063
See application file for complete search history.

(56) References Cited

U.S. PATENT DOCUMENTS

| 6,291,959 B1* | 9/2001 | Yoshida | G05B 19/404 318/567 |
| 2004/0078116 A1* | 4/2004 | Hashimoto | B25J 13/06 700/264 |
| 2009/0058342 A1* | 3/2009 | Nihei | B25J 9/1674 318/568.24 |
| 2009/0088898 A1* | 4/2009 | Nihei | B25J 5/02 700/253 |
| 2011/0199035 A1* | 8/2011 | Ooto | H02P 27/08 318/478 |
| 2014/0018958 A1 | 1/2014 | Ueno et al. | |
| 2015/0224646 A1* | 8/2015 | Benali | B25J 9/1674 700/245 |

FOREIGN PATENT DOCUMENTS

| CN | 101376249 A | 3/2009 |
| CN | 101396832 A | 4/2009 |
| CN | 103543685 A | 1/2014 |

(Continued)

*Primary Examiner* — Adam R Mott
(74) *Attorney, Agent, or Firm* — Hauptman Ham, LLP

(57) ABSTRACT

A robot control system includes an operation command output unit which outputs an operation command of a motor, a position detection unit which is provided on the motor to detect the position of a control shaft, a stop signal output unit which outputs a stop signal to stop the robot when the speed of the control shaft acquired from the position detection unit exceeds a speed threshold value, and an operation command interruption unit which interrupts the operation command outputted from the operation command output unit when the stop signal is outputted.

3 Claims, 3 Drawing Sheets

(56) References Cited

FOREIGN PATENT DOCUMENTS

| JP | 2003-305670 A | 10/2003 |
| JP | 2007-136617 A | 6/2007 |
| JP | 2009-050958 A | 3/2009 |
| JP | 2011-152612 A | 8/2011 |
| JP | 2014-16930 A | 1/2014 |

* cited by examiner

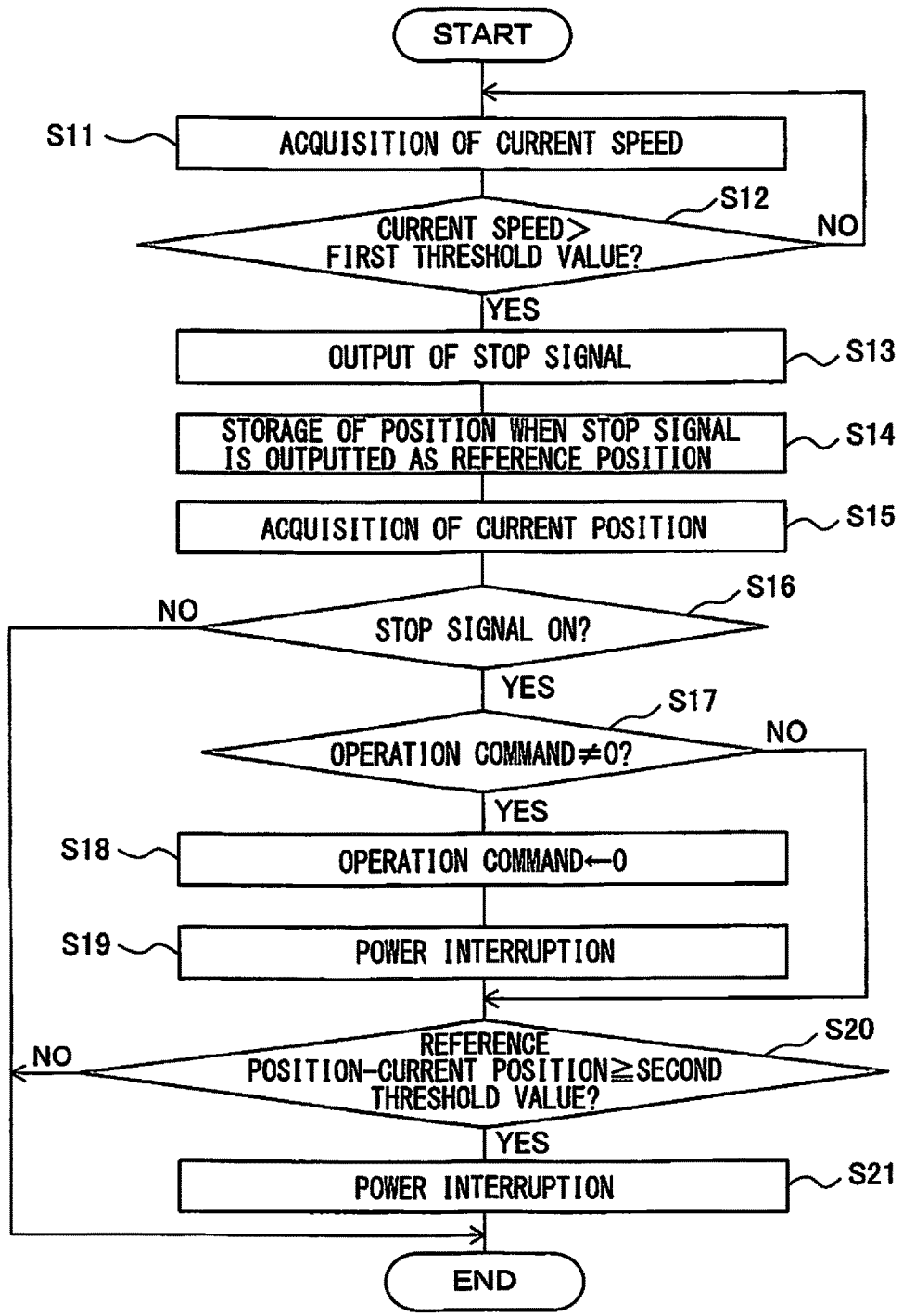

ROBOT CONTROL SYSTEM HAVING STOP FUNCTION

RELATED APPLICATIONS

The present application claims priority to Japanese Application Number 2014-147099, filed Jul. 17, 2014, the disclosure of which is hereby incorporated by reference herein in its entirety.

BACKGROUND OF THE INVENTION

1. Technical Field

The present invention relates to a robot control system for controlling an industrial robot (which will be hereinafter referred to simply as "robot"), and specifically, relates to a robot control system having a stop function.

2. Description of Related Art

In general, a robot control system monitors a shaft speed of a robot or a speed of a robot arm. If the speed exceeds a predetermined threshold value, the robot is stopped to thereby maintain the safety of an operator.

Japanese Unexamined Patent Publication (Kokai) No. 2009-50958 discloses that a servo motor is stopped based on the position of the servo motor detected by a position sensor provided on the servo motor.

In this connection, the shaft speed of the robot or the speed of a robot arm is calculated based on the result of the actual movement of the robot. Therefore, even if the robot is stopped, as mentioned above, a slight movement of the robot takes place before the robot actually stops. In Japanese Unexamined Patent Publication (Kokai) No. 2009-50958, as the servo motor is interrupted based on the position of the servo motor, there is a problem that a slight movement of the servo motor occurs before the shaft of the servo motor is stopped. Under these circumstances, the safety of an operator may not always be maintained.

The present invention has been made in view of the foregoing, and it is an object of the invention to provide a robot control system which is capable of stopping the robot before the servo motor begins operating.

SUMMARY OF THE INVENTION

In order to achieve the aforementioned object, according to the first aspect of the invention, there is provided a robot control system which controls a robot having at least one control shaft driven by a motor, comprising an operation command output unit which outputs an operation command of the motor, a position detection unit which is provided on the motor to detect the position of the control shaft, a stop signal output unit which outputs a stop signal to stop the robot when the speed of the control shaft acquired from the position detection unit exceeds a speed threshold value, and an operation command interruption unit which interrupts the operation command outputted from the operation command output unit when the stop signal is outputted.

According to the second aspect of the invention, a robot control system according to the first aspect of the invention further comprises a reference position storage unit which stores therein the position of the control shaft detected by the position detection unit at the time when the stop signal is outputted as a reference signal, and a power interruption unit which interrupts a power supply to the robot when a deviation between the position of the control shaft detected by the position detection unit and the reference position stored in the reference position storage unit exceeds a deviation threshold value while the stop signal is outputted.

According to the third aspect of the invention, in a robot control system according to the second aspect of the invention, when the operation command is outputted from the operation command output unit while the stop signal is outputted, the operation command interruption unit commands the power interruption unit to interrupt the power supply to the robot.

These and other objects, features and advantages of the present invention will become more apparent from the detailed description of the representative embodiments illustrated in the drawings.

BRIEF DESCRIPTION OF THE DRAWINGS

FIG. 3 is a flow chart showing the operation of the robot control system illustrated in FIG. 2.

DETAILED DESCRIPTION OF THE INVENTION

Figure 1:
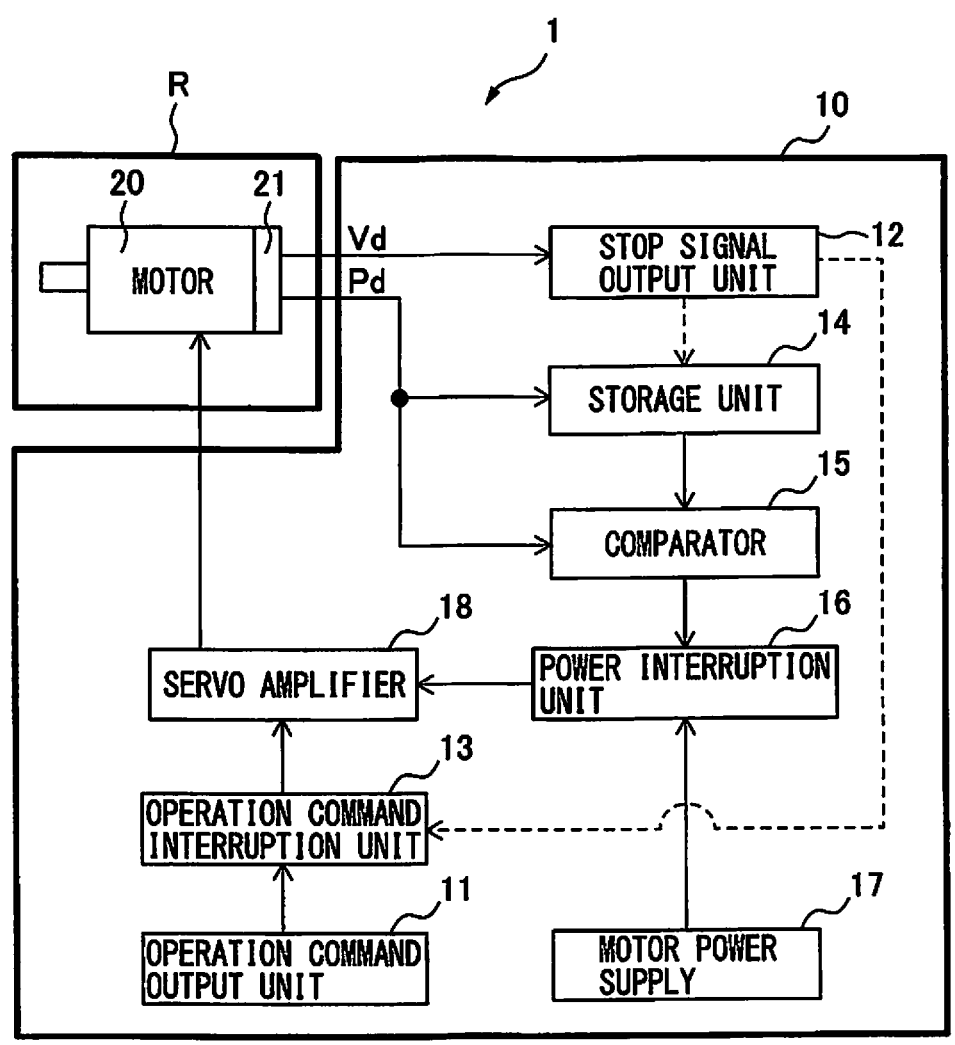
FIG. 1 is a function block diagram of a robot control system according to the first embodiment of the present invention.

The embodiments of the present invention will be discussed below with reference to the drawings. In the drawings, the same components are assigned the same reference numerals. For clarity, the scale of the drawings has been appropriately changed.

FIG. 1 is a function block diagram of a robot control system according to the first embodiment of the present invention. As can be seen in FIG. 1, the robot control system 1 is essentially composed of a robot R having a servo motor 20 which drives at least one control shaft, and a robot control device 10 which controls the robot R. In FIG. 1, etc., only one servo motor 20 is shown, but in fact, the robot 20 may include a plurality of control shafts and a plurality of corresponding servo motors.

An encoder 21 is attached to the servo motor 20, which is adapted to detect the position of the output shaft of the servo motor 20 at predetermined time intervals. The detected position is used to represent the position of the control shaft. The encoder 21 can output the speed of the control shaft based on the continuous two positions of the control shaft. The encoder 21 may output the speed of the control shaft by other methods.

As shown in FIG. 1, the robot control device 10 includes an operation command output unit 11 which outputs an operation command of the servo motor 20. The operation command output from the operation command output unit 11 is amplified by a servo amplifier 18 and is supplied to the servo motor 20. The servo amplifier 18 is connected to a motor power supply 17.

Further, the robot control device 10 includes a stop signal output unit 12 which outputs a stop signal to stop the robot when the speed of the control shaft detected by the encoder 21 exceeds a speed threshold value.

Furthermore, the robot control device 10 includes an operation command interruption unit 13 which interrupts the operation command outputted from the operation command output unit 11, when the stop signal is outputted. The operation command interruption unit 13 interrupts the operation command by making the operation command supplied from the operation command output unit 11 to be a zero command. As may be understood from FIG. 1, the operation command interruption unit 13 is arranged between the operation command output unit 11 and the servo amplifier 18.

The robot control device 10 includes a reference position storage unit 14 in which the position of the control shaft detected by the encoder 21 when the stop signal is outputted is stored as a reference position, and a power interruption unit 16 which interrupts the power supply to the robot R when a deviation between the position of the control shaft detected by the encoder 21 and the reference position stored in the reference position storage unit 14 exceeds a deviation threshold value. As shown in FIG. 1, the power interruption unit 16 is arranged between the motor power supply 17 and the servo amplifier 18 to interrupt the power supply from the motor power supply 17 to the servo amplifier 18. Note that, a comparator 15 shown in FIG. 1 compares various data.

Figure 2:
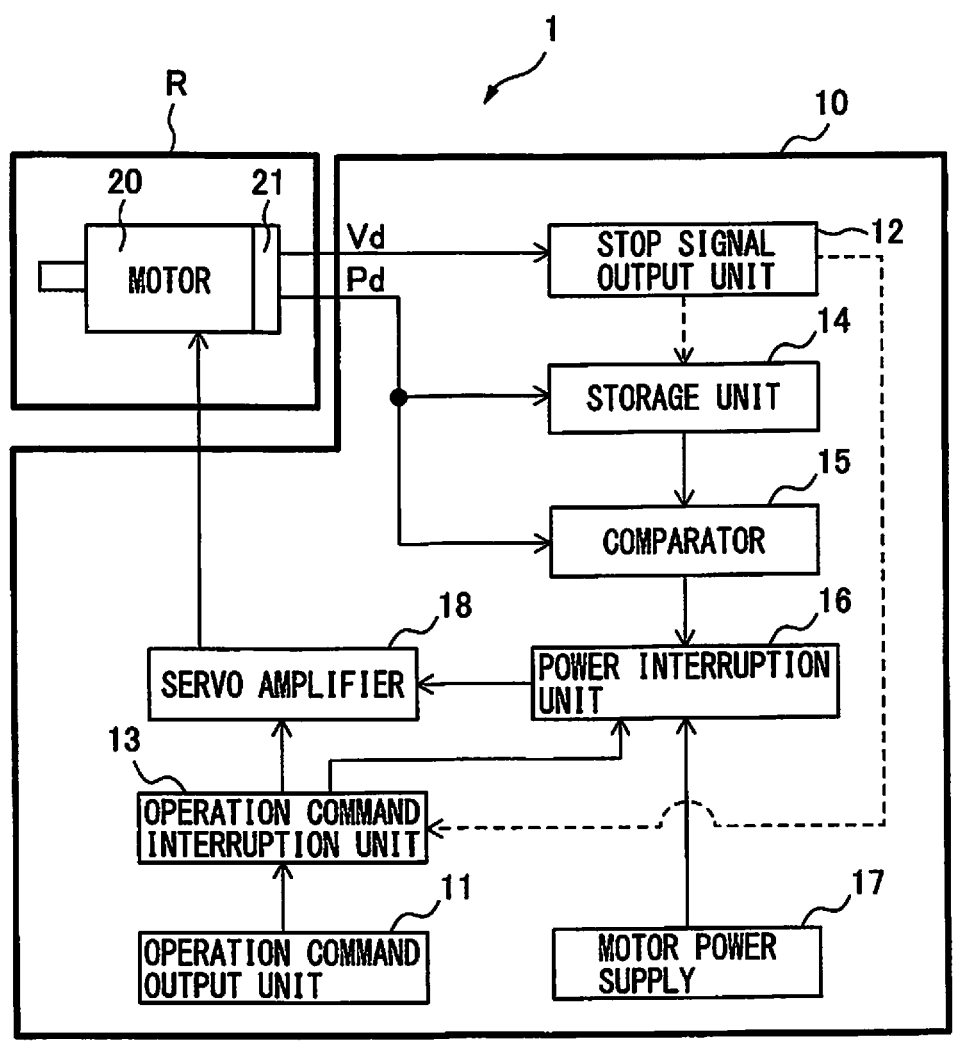
FIG. 2 is a function block diagram of a robot control system according to the second embodiment of the present invention.

FIG. 2 is a function block diagram of a robot control system according to the second embodiment of the present invention. For clarity, in FIG. 2, no duplicate explanation for the components corresponding to those in FIG. 1 is given. In FIG. 2, an arrow which extends from the operation command interruption unit 13 to the power interruption unit 16 is added. In other words, when the operation command is outputted from the operation command output unit 11 while the stop signal is outputted from the stop signal output unit 12, the operation command interruption unit 13 commands the power interruption unit 16 to interrupt the power supply to the robot R.

FIG. 3 shows a flow chart of the operation of the robot control system shown in FIG. 2. The operation of the robot control system 1 according to the second embodiment will be discussed below with reference to FIG. 3. The operation shown in FIG. 3 is repeated at a predetermined control cycle.

Note that, the operation of the robot control system 1 according to the first embodiment substantially corresponds to the operation shown in FIG. 3 with step S19 deleted therefrom. Therefore, an explanation of the operation of the robot control system 1 according to the first embodiment is not given herein.

First, at step S11, the robot control device 10 acquires the current speed Vd of the control shaft through the encoder 21. Then, at step S12, the comparator 15 compares the current speed Vd with the first threshold value (speed threshold value).

If the current speed Vd is larger than the first threshold value, it is considered that the speed of the control shaft of the robot R is too high. Therefore, in this case, the stop signal output unit 12 outputs a stop signal at step S13. Note that, if the current speed Vd is not larger than the first threshold value, the control is returned to step S11.

Then, at step S14, the robot control device 10 acquires the position of the control shaft when the stop signal is outputted through the encoder 21. The reference position storage unit 14 stores this position of the control shaft as a reference position. At step S15, the robot control device 10 acquires the current position Pd of the control shaft through the encoder 21.

Then, at step S16, whether the stop signal which has been outputted at step S13 is still effective is checked. If the stop signal is still effective, whether the operation command from the operation command output unit 11 is zero or not is checked at step S17. If the operation command is zero, the control proceeds to step S20 because the servo motor has already been stopped.

Conversely, if the operation command is not zero at step S17, the control proceeds to step S18 at which the operation command is made zero by the operation command interruption unit 13. Note that, the operation command interruption unit 13 may weaken the operation command to an extent so as to not influence the operator. Therefore, the operation command is substantially not inputted to the servo amplifier 18. As may be understood from the foregoing, in the present invention, the operation command interruption unit 13 interrupts the operation command of the servo motor 20 at step S18, and accordingly, it is possible to stop the robot R before the servo motor 20 begins operating. Therefore, the security of the operator can be secured.

Furthermore, at step S19, the power interruption unit 16 breaks the connection between the motor power supply 17 and the servo amplifier 18 to thereby interrupt the power supply. In this case, as the power interruption unit 16 interrupts the power supply after the operation command interruption unit 13 interrupts the operation command, the robot R is turned servo-off and reliably stopped. Therefore, it will be understood that the security of the operator can be more reliably secured.

Then, at step S20, the comparator 15 determines whether a deviation between the reference position stored at step S14 and the current position Pd acquired at step S15 is larger than the second threshold value (deviation threshold value). If the deviation is larger than the second threshold value, the power interruption unit 16 breaks the connection between the motor power supply 17 and the servo amplifier 18 to thereby interrupt the power supply. When the control shaft is greatly deviated from the reference position, the robot R can be stopped. As a result, the safety of the operator can be provided.

Effect of the Invention

According to the first embodiment, as the operation command interruption unit interrupts the operation command of the motor, it is possible to stop the robot before the motor begins operating. Therefore, the safety of the operator can be secured.

According to the second embodiment, the power interruption unit interrupts the power supply when the deviation between the position of the control shaft and the reference position exceeds the deviation threshold value. Namely, when the control shaft is considerably deviated from the reference position, the robot is stopped. Therefore, the safety of the operator can be secured.

According to the third embodiment, as the operation command interruption unit interrupts the operation command and the power interruption unit interrupts the power supply, it is possible to certainly stop the robot. Therefore, further security of the operator can be secured.

Although the above discussion has been directed to the representative embodiments of the invention, it will be understood by a person skilled in the relevant art that the above-mentioned modifications, other various modifications, deletion, or addition can be performed without departing from the scope of the present invention.

What is claimed is:
1. A robot control system, comprising:
a robot having at least one control shaft driven by a motor;
a robot control device configured to
output an operation command of the motor,
detect the position of the control shaft, in response to a speed on the control shaft exceeding a predetermined threshold value, output a stop signal to stop the robot, and in response to the stop signal being outputted and the operation command being other than zero, interrupt the operation command, store the position of the control shaft when the stop signal is outputted as a reference signal, and interrupt a power supply to the robot when a deviation between the position of the control shaft and the reference position exceeds a deviation threshold value while the stop signal is outputted; and a servo amplifier configured to amplify the operation command and supply the amplified operation command to the servo motor, wherein the robot control device is configured to interrupt the operation command after the operation command is outputted but before the outputted operation command is supplied to the servo amplifier.

2. The robot control system according to claim 1, wherein the robot control device is configured to, when the operation command is outputted, and while the stop signal is outputted, interrupt the power supply to the robot.

3. A robot control system, comprising:

a robot having at least one control shaft driven by a motor; and a robot control device configured to output an operation command of the motor, detect the position of the control shaft, in response to a speed on the control shaft exceeding a predetermined threshold value, output a stop signal to stop the robot, and in response to the stop signal being outputted and the operation command being other than zero, interrupt the operation command, store the position of the control shaft when the stop signal is outputted as a reference signal, and interrupt a power supply to the robot when a deviation between the position of the control shaft and the reference position exceeds a deviation threshold value while the stop signal is outputted, wherein the robot control device is configured to interrupt the operation command after the operation command is outputted but before the outputted operation command is supplied to a servo amplifier of the motor.

* * * * *